US008107109B2

(12) United States Patent
Okada

(10) Patent No.: US 8,107,109 B2
(45) Date of Patent: Jan. 31, 2012

(54) IMAGE PROCESSING APPARATUS, IMAGE PROCESSING SYSTEM, IMAGE PROCESSING METHOD AND COMPUTER READABLE MEDIUM

(75) Inventor: Toshihiko Okada, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 869 days.

(21) Appl. No.: 12/143,186

(22) Filed: Jun. 20, 2008

(65) Prior Publication Data

US 2009/0161148 A1 Jun. 25, 2009

(30) Foreign Application Priority Data

Dec. 21, 2007 (JP) ................................ 2007-330575

(51) Int. Cl.
*G06F 3/12* (2006.01)
*G06F 15/00* (2006.01)
*H04N 1/32* (2006.01)

(52) U.S. Cl. .................... 358/1.15; 358/1.9; 358/468

(58) Field of Classification Search .............. 358/448, 358/468, 400, 401, 500, 501, 1.15; 705/17, 705/24

See application file for complete search history.

(56) References Cited

U.S. PATENT DOCUMENTS

| 5,930,004 | A * | 7/1999 | Imai et al. ................ 358/442 |
| 6,906,814 | B1 * | 6/2005 | Aonuma et al. ........... 358/1.15 |
| 7,679,767 | B2 * | 3/2010 | Kitada .................... 358/1.15 |
| 2003/0103236 | A1 | 6/2003 | Kato |
| 2003/0202213 | A1 | 10/2003 | Saito |
| 2005/0168768 | A1 | 8/2005 | Ito |
| 2005/0195431 | A1 | 9/2005 | Van Den Tillaart et al. |
| 2005/0212904 | A1 * | 9/2005 | Uejo ...................... 347/248 |
| 2005/0213144 | A1 | 9/2005 | Uejo |
| 2005/0214017 | A1 | 9/2005 | Isobe et al. |
| 2006/0012826 | A1 * | 1/2006 | Kajiwara et al. ......... 358/1.15 |
| 2006/0031585 | A1 * | 2/2006 | Nielsen et al. ........... 709/246 |
| 2007/0005561 | A1 | 1/2007 | Sakura et al. |
| 2008/0184013 | A1 * | 7/2008 | Tanimoto ................. 712/226 |
| 2009/0089172 | A1 * | 4/2009 | Quinlan et al. ............. 705/17 |

FOREIGN PATENT DOCUMENTS

| EP | 0 806 721 A1 | 11/1997 |
| EP | 1 717 692 A2 | 11/2006 |
| JP | 10240657 A | 9/1998 |
| JP | 2003162393 A | 6/2003 |
| JP | 2003-276150 A | 9/2003 |
| JP | 2005-196275 A | 7/2005 |
| JP | 2005-231372 A | 9/2005 |
| JP | 2005271296 A | 10/2005 |
| JP | 2006-201939 A | 8/2006 |
| JP | 2007-11576 A | 1/2007 |

* cited by examiner

*Primary Examiner* — Jerome Grant, II
(74) *Attorney, Agent, or Firm* — Sughrue Mion, PLLC

(57) ABSTRACT

An image processing apparatus includes an accepting unit, a selecting unit, a first forming instruction generating unit and a second forming instruction generating unit. The accepting unit accepts a forming instruction for forming an image. The selecting unit selects a first image forming apparatus and a second image forming apparatus which form an image on recording media based on the accepted image forming instruction and have a different performance from each other. The first forming instruction generating unit that generates a first forming instruction for causing the first image forming apparatus to form a page that can be formed by the first image forming apparatus. The second forming instruction generating unit generates a second forming instruction for causing the second image forming apparatus to form another page that cannot be formed by the first image forming apparatus.

13 Claims, 5 Drawing Sheets

*FIG. 2*

| IMAGE FORMING APPARATUS | PERFORMANCE |
|---|---|
| a a a a | 30 SHEETS PER MINUTE, FULL COLOR, MONOCHROME |
| b b b b | CASE BINDING FINISHER, 60 SHEETS PER MINUTE, HIGHLIGHT COLOR, MONOCHROME |
| ⋮ | ⋮ |

FIG. 5

| IMAGE FORMING APPARATUS | PERFORMANCE | ALTERNATIVE ENABLE INFORMATION |
|---|---|---|
| a a a a | 30 SHEETS PER MINUTE, FULL COLOR, MONOCHROME | — |
| b b b b | CASE BINDING FINISHER, 60 SHEETS PER MINUTE, HIGHLIGHT COLOR, MONOCHROME | FULL COLOR |
| ⋮ | ⋮ | ⋮ |

IMAGE PROCESSING APPARATUS, IMAGE PROCESSING SYSTEM, IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2007-330575 filed Dec. 21, 2007.

BACKGROUND

1. Technical Field

The present invention relates to an image processing apparatus, an image processing system, an image processing method and a computer readable medium.

2. Related Art

There has been developed an apparatus for coupling and outputting plural printing jobs as one printing job.

SUMMARY

According to an aspect of the invention, an image processing apparatus includes an accepting unit, a selecting unit, a first forming instruction generating unit and a second forming instruction generating unit. The accepting unit accepts a forming instruction for forming an image. The selecting unit selects at least a first image forming apparatus and a second image forming apparatus which (i) form an image on recording media based on the accepted image forming instruction and (ii) have a different performance from each other. The first forming instruction generating unit that generates a first forming instruction for causing the first image forming apparatus to form a page that can be formed by the first image forming apparatus, among plural pages to be formed on the recording media in accordance with the accepted forming instruction. The second forming instruction generating unit generates a second forming instruction for causing the second image forming apparatus to form another page that cannot be formed by the first image forming apparatus, among the plural pages to be formed on the recording media. The first forming instruction includes an instruction for causing the first image forming apparatus to process (i) the recording medium on which the page is formed by the first image forming apparatus and (ii) the recording medium on which the another page is formed by the second image forming apparatus according to the first image forming apparatus.

BRIEF DESCRIPTION OF THE DRAWINGS

Exemplary embodiment(s) of the present invention will be described in detail based on the following figures, wherein:

FIG. 2 is an explanatory diagram illustrating an example of performance database in the image processing apparatus according to the exemplary embodiment of the invention;

FIG. 5 is an explanatory diagram illustrating another example of the performance database in the image processing apparatus according to the exemplary embodiment of the invention.

DETAILED DESCRIPTION

Figure 1:
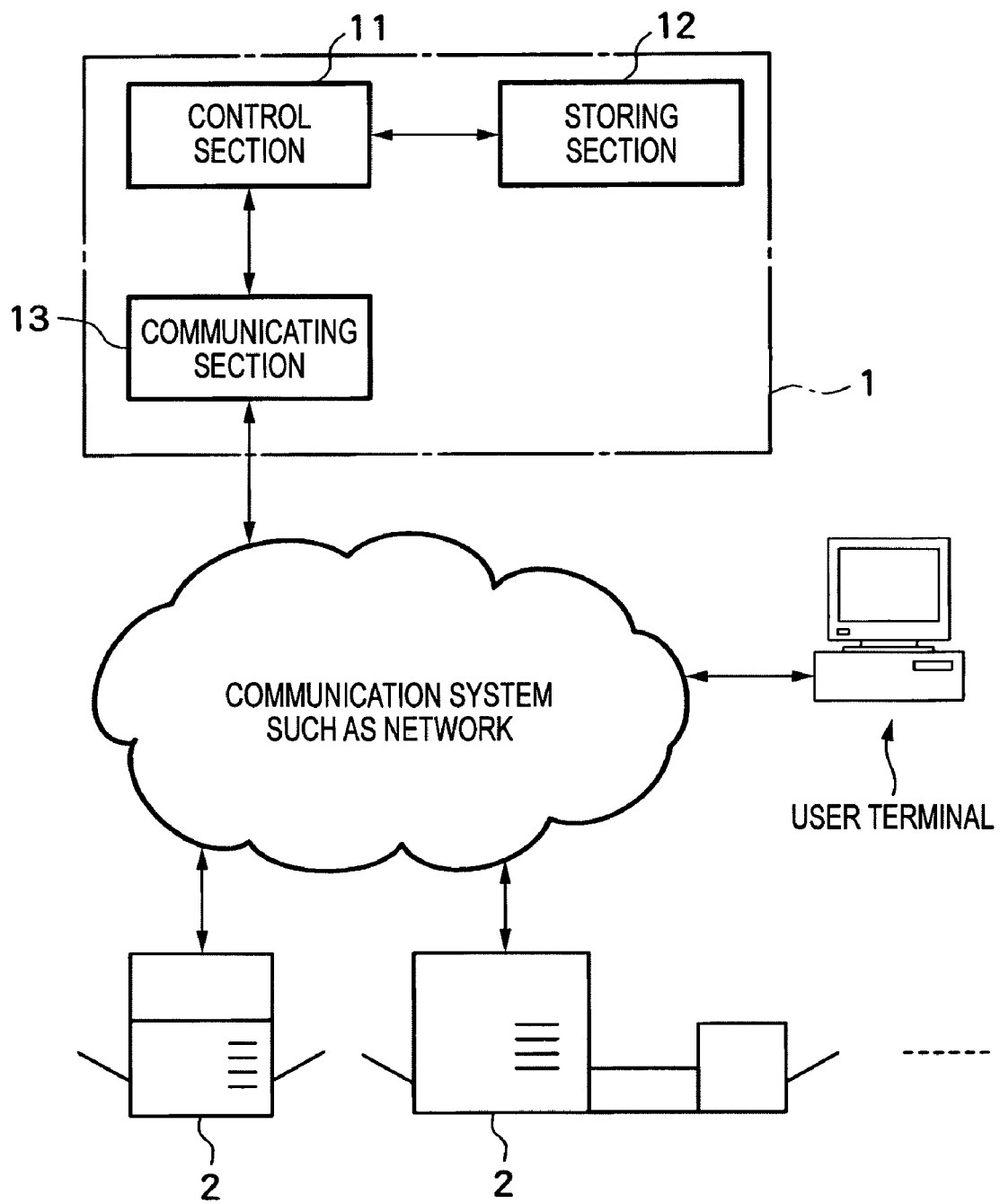
FIG. 1 is a block diagram illustrating an image processing apparatus and an example of a connection thereof according to an exemplary embodiment of the invention.

An exemplary embodiment according to the invention will be described with reference to the drawings. An image processing apparatus 1 according to the exemplary embodiment of the invention is constituted to include a control section 11, a storing section 12 and a communicating section 13 as shown in FIG. 1.

The control section 11 is a program control device such as a CPU (Central Processing Unit) which is operated in accordance with a program stored in the storing section 12. The control section 11 accepts plural forming instructions (print jobs) such as image forming instructions for plural documents. Each of the forming instructions includes at least an instruction for forming an image of one page. The forming instruction may be accepted from a plurality of transmitting sources.

The control section 11 selects, as a first image forming apparatus 2-1, an image forming apparatus 2 for carrying out a formation processing over at least a part of pages for the accepted image forming instructions in a plurality of image forming apparatuses 2a, 2b. . . . The selection may be carried out based on information about performances related to the image forming apparatuses 2a, 2b. . . and an instruction for the formation processing which are stored in the storing section 12, for example. Hereinafter, the image forming apparatus 2 is used as the generic name for the image forming apparatuses 2a, 2b. . . .

In the case in which any of the pages cannot be subjected to the formation processing by the first image forming apparatus 2-1 which is selected, moreover, the control section 11 selects a second image forming apparatus 2-2 for executing the formation processing over the page which cannot be subjected to the formation processing through the first image forming apparatus 2-1. The selection may also be carried out based on the content of the forming instruction for the page which cannot be subjected to the formation processing through the first image forming apparatus 2-1 and information relating to the performance of each of the image forming apparatuses 2.

The control section 11 generates image forming instructions for pages which are to be processed by the selected image forming apparatus 2-1 and 2-2, respectively. The operation of the control section 11 will he described below in detail.

The storing section 12 includes a storing device such as an RAM (Random Access Memory) and a disk device such as a hard disk. The storing section 12 stores a program to be executed by the control section 11. The program may be provided in a storing state in a computer readable recording medium such as a DVD-ROM and may be copied onto the storing section 12. Moreover, the storing section 12 is also operated as a working memory for the control section 11.

In the exemplary embodiment, furthermore, the storing section 12 may hold the information about the respective performances for the image forming apparatuses 2 having different performances from each other. More specifically, the storing section 12 according to the exemplary embodiment stores a performance database in which information about a performance such as a color printing performance (a full color, highlight color (polychrome) or monochrome) or the presence of a finisher associated with information for specifying the image forming apparatus 2 as is illustrated in FIG. 2. The information for specifying the image forming apparatus 2 may be a network address of the image forming apparatus 2, for example.

Furthermore, image information received from an external device and an instruction for the formation are stored in the storing section 12. In the exemplary embodiment, it is assumed that each page included in a document to be a forming target can be individually received. Therefore, specifying information for specifying a document and each page which can be included therein is provided in advance. The information may be described by a predetermined method such as JDF (Job Definition Format). An example of the information described in the JDF is as follows.

<projectname> report for 2006
<copies> 1000
<option> check, print
<finishing> casebound book
<cover>
<stock> binding paper
<contents:001> Covers.ai
<bodies>
<stock> plain paper
<contents:002> Body.doc
<contets:003> Appendix.xls It is specified that a page to be formed based on data of Covers.ai, a page to be formed based on data of Body.doc and a page to be formed based on data of Appendix.xls are individually present respectively, and an instruction for checking and forming data (1000 parts) is given. Moreover, there is given an instruction for forming, on a special paper for binding, the page to be formed based on the data of Covers.ai, and there is given an instruction for forming the other pages on a plain paper. An instruction for carrying out finishing through casebound book is included.

The communicating section 13 is a network interface, for example, and is connected to enable a communication with another apparatus (for example, the image forming apparatus 2) through a communication line such as a network.

Next, the operation of the control section 11 will be described. The control section 11 according to the exemplary embodiment receives and holds specifying information. The specifying information has a specified page to be included in a document. Upon receipt of data which relates to the page specified by the specifying information, the control section 11 executes a predetermined preflight check for the same data. The preflight check implies a processing of detecting an abnormality of data. For example, it is assumed a case in which image information for the image formation is not represented by a color space in a formation (a color space constituted by four colors of cyan, magenta, yellow and black), but represented by a different color space (a color space constituted by red, green and blue).

When deciding that the data have a problem as a result of the preflight check, the control section 11 transmits a message, to a transmitting source of the data, indicating the problem has been detected. If the data have no problem as a result of the preflight check, moreover, the control section 11 generates an instruction for drawing and forming an image for each page (a page instruction). At this time, furthermore, the control section 11 may generate an image reduced to have a predetermined size (a thumbnail image) every page. In addition, the control section 11 may generate a formation processing instruction (a job ticket) every page. The job ticket can extract and generate a corresponding portion to a predetermined command group other than a drawing command in accepted data. The command group includes commands for designating a paper tray and a paper type, for example. Moreover, the job ticket may include information based on the specifying information. The job ticket thus generated includes (i) information specifies a page instruction which is obtained from data on a corresponding page, and (ii) information about a paper, (iii) information about finishing, (iv) information about the number of parts, and (v) information about an assembling position as information about the processing.

Figure 3:
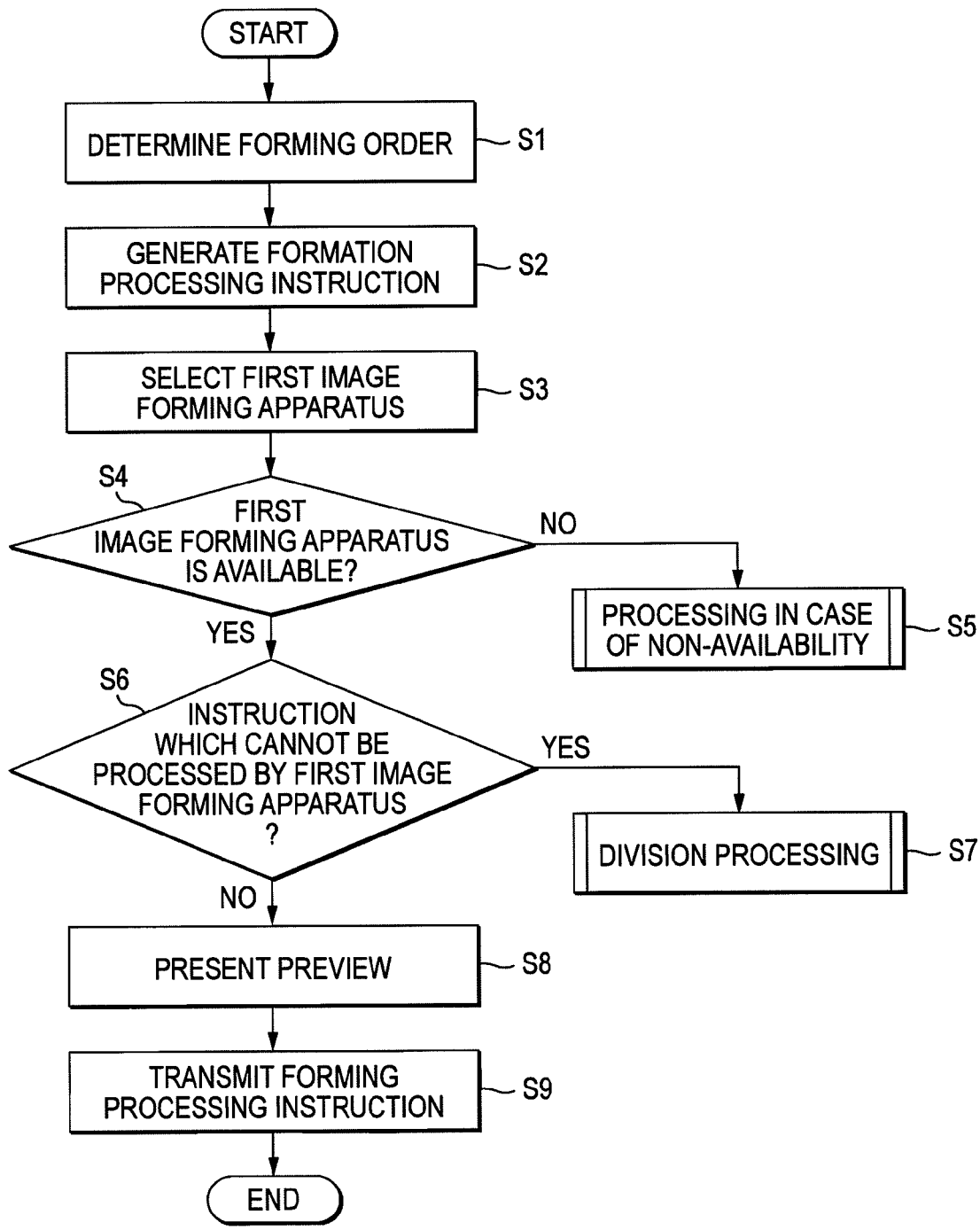
FIG. 3 is a flowchart showing an example of a processing in the image processing apparatus according to the exemplary embodiment of the invention.

When deciding that all of data on the pages specified in the specifying information are received and the preflight check for them has no problem, the control section 11 starts a processing shown in FIG. 3 and determines formation processing order for the page instructions based on the specifying information (S1). As an example, the forming order is determined in such a manner that each page included in Body.doc is formed in including order and each page included in Appendix.xls is subsequently formed in including order when the specifying information has the following.

<bodies>
<stock> plain paper
<contents:002> Body.doc
<contents:003> Appendix.xls The control section 11 synthesizes page instructions in the forming order determined in the processing S1 to generate an image forming instruction for a document, and furthermore, synthesizes formation processing instructions generated for the respective pages to generate a whole formation processing instruction of the document (S2) Consequently, a forming condition for each page (image information) is determined as follows, for example.

Page size: A4
Finisher: casebound book
. . .
2 to 15 pages: monochrome, plain paper, both faces
16 to 22 pages: full color, plain paper, single face The control section 11 refers to the whole formation processing instruction generated in the processing S2, thereby finding information about a finisher which is designated through the formation processing instruction Then, the control section 11 refers to a performance database related to the image forming apparatus 2, thereby selecting the image forming apparatus 2 comprising the designated finisher (S3). In the following description, the image forming apparatus 2 selected in the processing S2 will be referred to as the first image forming apparatus 2-1. The control section 11 stores information for specifying the first image forming apparatus 2-1.

The control section 11 checks an availability of the first image forming apparatus 2-1 which is selected (S4). The availability is judged based on information indicating a current processing waiting situation (a time required for completing a job which is being requested), information indicating an ON/OFF state of a power supply (which is checked depending on whether a response to a signal for requiring the response is given within a predetermined time by transmitting the same signal).

For example, in the processing S4, the control section 11 gives the first image forming apparatus 2-1 an inquiry about an extent to which formation processing requests based on the whole formation processing instruction are accumulated. Then, the control section 11 acquires information relating to an amount of a processing to be carried out in response to the accumulated whole formation processing requests (for example, the number of papers to be output). The control section 11 calculates a waiting time before the first forming apparatus 2-1 processes the image formation processing from information about the processing amount thus acquired. The calculation may be obtained by multiplying a formation processing performance of the first image forming apparatus 2-1 (the number of sheets processed per minute) by the information relating to the amount of the processing to be carried out in response to the accumulated whole formation processing requests.

If it is decided that a power supply for the first image forming apparatus 2-1 is OFF or the formation processing cannot be started or completed within a previously designated time depending on a processing waiting situation, the control section 11 executes a processing for a non-availability (S5). The processing for the non-availability may be a processing of outputting, to a user, alarm information about "the power supply is OFF" or "the processing will be waited for X minutes", for example. Another example of the processing for the non-availability will be described later. In the processing S5, if the user gives an instruction indicating that, when the first image forming apparatus 2-1 is judged to be non-available, the control section 11 waits until the first image forming apparatus 2-1 to be available, the control section 11 may execute a processing S6 and succeeding processings. At this time, the control section 11 may exactly execute the processing S6 and the succeeding processings or may execute the processing S6 and the succeeding processings by waiting until the first image forming apparatus 2-1 to be available.

Although the control section 11 checks the power ON/OFF state of the first image forming apparatus 2-1, a database (an availability database) may be provided in the image processing apparatus 1 for holding information which is successively changed, for example, a state of a power supply of each image forming apparatus 2 or a processing waiting situation. In this case, the control section 11 may acquire information representing the situation of the first image forming apparatus 2-1 from the availability database. When the availability database is thus used, a manager may input, to the availability database, information representing a time that the image formation processing can be started or information representing a cause, for example, information about a situation of maintenance and inspection if a work for the maintenance and inspection is generated.

If it is decided that the power supply of the first image forming apparatus 2-1 is ON and a formation processing can be started or completed within a previously designated time in a processing waiting situation, the control section 11 decides that the image forming apparatus 2 as the first image forming apparatus 2-1 is available and a next processing is then executed.

Subsequently, the control section 11 checks whether an instruction which cannot be processed by the first image forming apparatus 2-1 is included in the whole formation processing instruction or not (S6). For example, the control section 11 refers to the performance database, thereby acquires information about the performance of the first image forming apparatus 2-1, and refers to the whole formation processing instruction, thereby checks whether an instruction which can not be processed based on the acquired information about the performance is included in the whole formation processing instruction or not.

As a specific example, the first image forming apparatus 2-1 can form an image in a highlight color (for example, four-color printing). If a machine type in which an image formation in a full color cannot be carried out and the image forming instruction includes a processing in the full color, it is decided that an instruction which cannot be processed by the first image forming apparatus 2-1 is included in the whole formation processing instruction and a division processing is thus started (S7). Also if the whole formation processing instruction has an instruction relating to a paper having a type and a size which are not set to the first image forming apparatus 2-1, it is decided that the instruction which cannot be processed by the first image forming apparatus 2-1 is included in the whole formation processing instruction, and the division processing is started. The division processing will be described below.

If the instruction which cannot be processed by the first image forming apparatus 2-1 is not included in the formation processing instruction, the control section 11 generates an image representing a result of the image forming processing (a so-called preview) and transmits the same image to a terminal on a user side, and presents the same image to the user (S8). Then, the control section 11 waits for a formation starting instruction through a terminal on the user side. When an instruction for interrupting the formation is given through the terminal on the user side, the control section 11 once ends the processing. When the formation starting instruction is given through the terminal on the user side, the instruction for forming the image of the document which is generated in the processing S2 and a job ticket (a formation processing instruction for the whole document) are transmitted to the first image forming apparatus 2-1 (S9) and the processing is ended.

Figure 4:
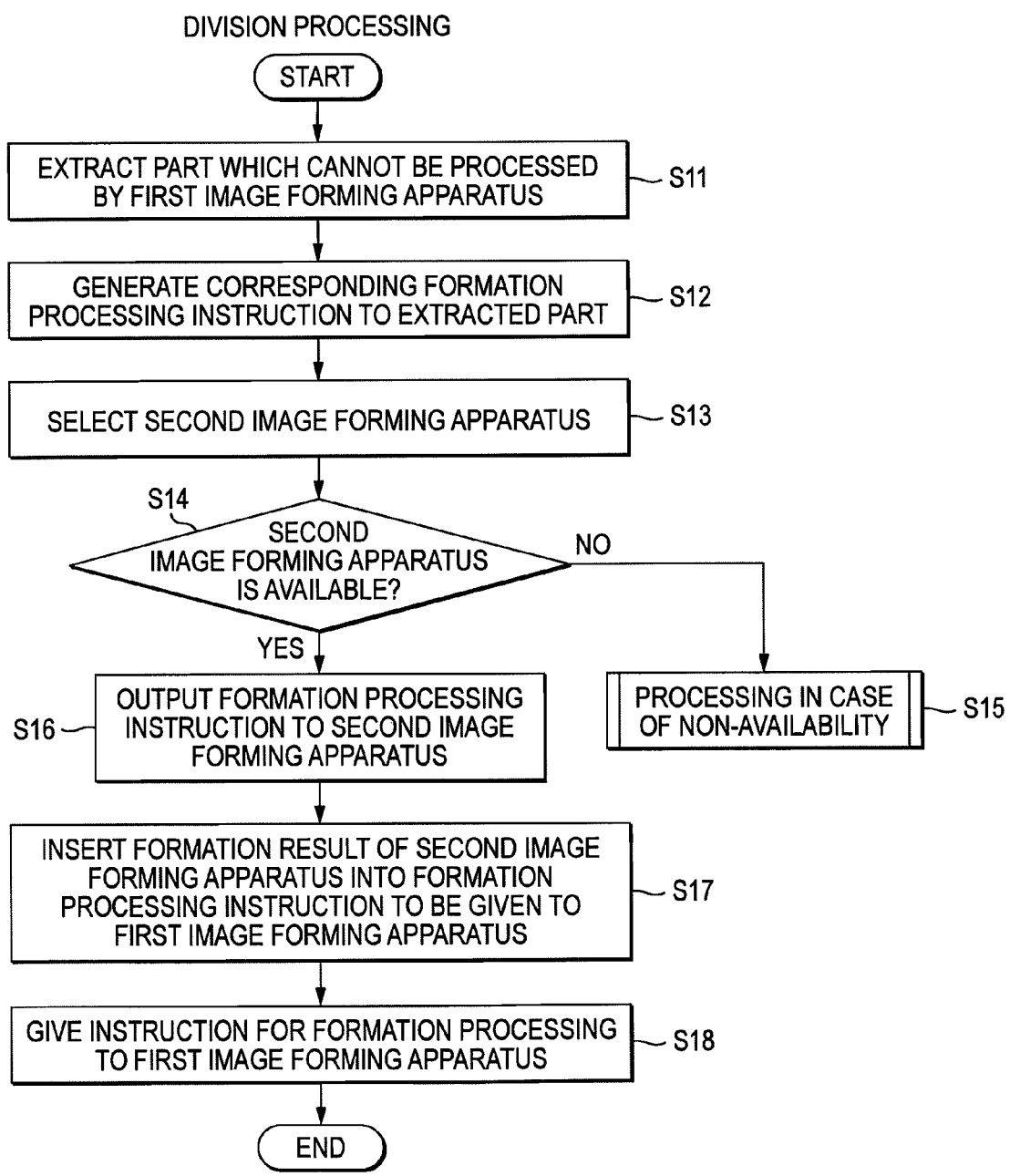
FIG. 4 is a flowchart showing an example of a division processing in the image processing apparatus according to the exemplary embodiment of the invention.

Next, description will be given to the division processing to be executed by the control section 11 (the processing to be executed in the processing S7). In the processing, as shown in FIG. 4, with reference to whole formation processing instruction, an formation processing instruction which the first image forming apparatus 2-1 cannot carry out is extracted (S11). For examples when the following whole formation processing instruction is given as described above and if the first image forming apparatus 2-1 disables the full-color processing, a formation processing instruction for a processing on pages 16 to 22 to which an instruction for a full color is given is extracted and removed from the whole formation processing. The whole formation processing instruction subjected to this extraction is a source of a first processing instruction.

Paper size: A4
Finisher: casebound book
. . .
Pages 2 to 15: monochrome, plain paper, both faces
Pages 16 to 22: full color, plain paper, single face Then, the control section 11 generates another formation processing instruction (a second processing instruction) including the extracted formation processing instruction (S12). The generated instruction is as follows.

Paper size: A4
Finisher: casebound book
. . .
Pages 16 to 22: full color, plain paper, single face Next, the control section 11 refers to the performance database, thereby selects the image forming apparatus 2 (referred to as the second image forming apparatus 2-2) other than the first image forming apparatus 2-1, which can execute the formation processing in accordance with the second processing instruction generated in the processing S12 (S13). In this case, if there are plural candidates for the second image forming apparatus 2-2 capable of executing the second processing instruction generated in the processing S12, (i) any of candidates may be sequentially selected in view of installation place closest to that of the first image forming apparatus 2-1 or (ii) may be selected by a user. In the former case, it may be that information about the installation place is included in the performance database.

The control section 11 checks the availability of the second image forming apparatus 2-2 which is selected in the processing S13 (S14). The processing is the same as the processing S4 shown in FIG. 3.

If it is decided that a power supply of the second image forming apparatus 2-2 which is selected is OFF or the image forming formation cannot be started or completed within a time designated previously in a processing waiting situation, a processing is executed when the second image forming apparatus 2-2 is not available (S15). The processing is also the same as the processing S5 shown in FIG. 3.

When the control section 11 decides that the second image forming apparatus 2-2 is available in the processing S14, the control section 11 transmits, as a second forming instruction, the second processing instruction generated in the processing S12 and an instruction for forming an image of a page corresponding thereto to the second image forming apparatus 2-2 and gives an instruction for forming the pages (S16). Prior to the processing, the same preview processing as that in the processing S8 may be carried out.

Moreover, the control section 11 inserts, into the formation processing instruction (the first processing instruction) which is transmitted to the first image forming apparatus 2-1 and is the whole forming instruction extracted in the processing S11, (i) an a result of the formation (the formed page) in the second image forming apparatus 2-2 with a corresponding position and (ii) an instruction for outputting to the finisher (S17). The control section 11 transmits, to the first image forming apparatus 2-1, as the first image forming instruction, (i) the formation processing instruction (the first processing instruction) after the insertion of the instruction and (ii) image information to be a forming target and included in the formation processing instruction (S18). The first processing instruction includes an instruction for causing the first image forming apparatus 2-1 to execute a postprocessing (a processing to be carried out through the finisher) for both the page formed by the first image forming apparatus 2-1 and the page formed by the second image forming apparatus 2-2.

The work for inserting the formation result (the formed page) in the second image forming apparatus 202 into a corresponding position of the page group formed by the first image forming apparatus 2-1 may be manually carried out by a user. However, it is necessary to carry out the processing in the finisher in order of the pages subjected to the fetching work, and there is required an instruction for fetching the formation result (the formed page) in the second image forming apparatus 2-2 into the corresponding position and outputting the result to the finisher.

Although the control section 11 outputs alarm information as a processing in case of the non-availability if it is decided that the first image forming apparatus 2-1 or the second image forming apparatus 2-2 is not available as a result of the availability checking work in the processing S4 or S14, moreover, this is not restricted. And, if it is decided that there is a forming instruction which cannot be processed by the first image forming apparatus 2-1 in the processing S6, the division processing (the processing S7) is not immediately executed but a next processing may be carried out when a reselecting condition is satisfied described below.

For example, when the apparatus is not available or the division processing is to be executed, the control section 11 may reselect the image forming apparatus 2. If the image forming apparatus 2 having a corresponding performance to the formation processing instruction cannot be found in the reselection, furthermore, it is also possible to alternatively select the image forming apparatus 2 having an equivalent performance to the corresponding performance on a predetermined condition.

In the case in which the alternative selection processing is carried out, information (alternative enable information) indicating a condition to be selected as an alternative apparatus which has an equivalent performance, as well as information indicating a performance such as a distinction of full color/highlight color (multicolor printing)/monochrome or the presence of the finisher, is in associated with the information for specifying the image forming apparatus 2 shown in FIG. 2 in the performance database (FIG. 5).

For example, a full color processing is included as the alternative enable information in the image forming apparatus 2 having a highlight color forming performance.

When the image forming apparatus 2 having a corresponding performance to the formation processing instruction cannot be found in the reselection, the control section 11 of the image processing apparatus 1 selects the image forming apparatus 2 having the alternative enable information corresponding to the formation processing instruction. For example, if the full color image forming apparatus 2 is not available when a full color formation processing instruction is given, the control section 11 selects the image forming apparatus 2 including a full color processing in the alternative enable information. As an example, the image forming apparatus 2 (referred to as an alternative apparatus) having the highlight color forming performance is selected as an equivalent performance to a full color.

Moreover, the user may specify the image forming apparatus 2 to carry out the processing in place of the execution of the reselection processing through the control section 11. For example, also when it is decided that the forming processing instruction which cannot be processed by the first image forming apparatus 2-1 is included in the whole formation processing instruction, the user may give an instruction for causing the first image forming apparatus 2-1 to execute the processing. At this time, the first image forming apparatus 2-1 is selected as the alternative apparatus and the contents of the image formation processing are changed as follows.

In these cases, before transmitting the formation processing instruction or the image information to the image forming apparatus 2 which is reselected or the image forming apparatus 2 specified by the user (which will be hereinafter referred to as an alternative apparatus), the control section 11 generates an image (a preview) representing a result of the formation processing through the alternative apparatus and transmits the image to a terminal on the user side, and thus presents the image to the user.

When the user further gives an instruction for changing the selection, the control section 11 stores, as selecting history information, information for specifying the image forming apparatus 2 to be the alternative apparatus. It is also possible to repeat the processing from carrying out the processing of reselecting, as the alternative apparatus, any of the image forming apparatuses 2 other than the image forming apparatus 2 selected as the alternative apparatus in the past in the selecting history information. When the user designates the specific image forming apparatus 2 as the alternative apparatus, moreover, the processing may be repeated by setting the designated image forming apparatus 2 as a newly alternative apparatus.

When the user approves the presented preview to give an instruction for starting the formation processing, moreover, the formation processing instruction and corresponding image information are transmitted to the image forming apparatus 2 to be the alternative apparatus which is reselected.

Furthermore, the control section 11 may transmit, together with the preview, information indicating a cause for deciding that there is no availability in the processing S4 or S14 shown in FIGS. 3 and 4 (an OFF state of the image forming apparatus 2 or a date for the availability).

In this case, the user may give an instruction for utilizing the first image forming apparatus 2-1 or the second image forming apparatus 2-2 which has not been subjected to the reselection. The control section 11 receiving the instruction transmits the formation processing instruction and the image information to the image forming apparatus 2 which has not been subjected to the reselection.

Since the image processing apparatus 1 according to the exemplary embodiment has the structure described above, it is operated in the following manner. In an example which will be described below, it is assumed that the following specifying information is received and each file designated by a tag of <contents:x> is then received. Moreover, it is assumed that a file of Appendix.xls has a full color and the other files are monochromatic.

<projectname> report for 2006
<copies> 1000
<option> check, print
<finishing> casebound book
<bodies>
<stock> plain paper
<contents:001> Body.doc
<contets:002> Appendix.xls The image processing apparatus 1 generates image information corresponding to each page from the received file, and furthermore, generates a formation processing instruction per page. The pages are rearranged in order of the formation processing to synthesize the formation processing instructions. Consequently, the following formation processing instruction is generated, for example.

Paper size: A4
Finisher: casebound book
. . .
Pages 2 to 15: monochrome, plain paper, both faces
Pages 16 to 22: full color, plain paper, single face The image processing apparatus 1 selects, as the first image forming apparatus 2-1, the image forming apparatus 2 having the casebound book finisher. Herein, it is assumed that the first image forming apparatus 2-1 can forms an image with the highlight color and cannot forms the image with a full color.

The image processing apparatus 1 checks whether the first image forming apparatus 2-1 is available or not (whether or not a power supply is ON and the image forming processing can be started within a predetermined time). If it is decided that the first image forming apparatus 2-1 is available, the image processing apparatus 1 further refers to the information about the performance of the first image forming apparatus 2-1 and finds that the first image forming apparatus 2-1 does not cope with the full color, thereby deciding that the processings on pages 16 to 22 are disabled. Then, the division processing is started.

The image processing apparatus 1 generates a formation processing instruction for a part to be a dividing target (a part which cannot be processed by the first image forming apparatus 2-1). The generated instruction is as follows.

Paper size: A4
Finisher: casebound book
. . .
Pages 16 to 22: full color, plain paper, single face The image processing apparatus 1 selects the image forming apparatus 2 acting as the second image forming apparatus 2-2 which can carry out a full color processing. Then, the availability of the second image forming apparatus 2-2 is checked. When the image forming apparatus 2 selected as the second image forming apparatus 2-2 is not available (for example, the processing cannot be carried out within a predetermined time), the image processing apparatus 1 reselects the image forming apparatus 2 for executing the processing in place of the image forming apparatus 2 acting as the second image forming apparatus 2-2.

It is assumed that the image forming apparatus 2 acting as the first image forming apparatus 2-1 is selected by referring to the performance database. In this case, the image processing apparatus 1 generates a preview image representing a formation result in the image forming apparatus 2 which is reselected and offers the image to the user side, thereby requiring a confirmation.

When the user gives an instruction for starting the formation processing, the image processing apparatus 1 gives an instruction for the formation processing to the image forming apparatus 2 acting as the first image forming apparatus 2-1 which is reselected in order to print the image information in the highlight color.

Moreover, the image processing apparatus 1 includes an instruction for inserting the formation result in the formation processing instruction to be an extracting source. More specifically, the formation processing instruction is updated as follows.

Paper size: A4
Finisher: casebound book
. . .
Pages 2 to 15: monochrome, plain paper, both faces
Pages 16 to 22: delivery from manual tray Then, image information on pages 2 to 15 are transmitted to the first image forming apparatus 2-1 together with the formation processing instruction thus updated, and the first image forming apparatus 2-1 is caused to carry out the image formation and the casebound book processing.

While the image forming apparatus 2 for carrying out the formation processing is selected on a page unit for the accepted image forming instruction in the description, respective pages are formed on both faces of a recording medium in some cases and plural pages are formed on one of faces of the recording medium in other cases, for example.

When an instruction for respective pages formed on both faces of the recording medium or plural pages formed on a single face thereof is given, by referring to the image formation processing instruction, the control section 11 may specify page(s) included in each of the faces of the recording medium and may decide whether a forming processing instruction corresponding to the specified page(s) can be processed by the first image forming apparatus 2-1 or not.

When the specified page has the forming processing instruction which cannot be processed by the first image forming apparatus 2-1, the forming processing instruction for the face of the recording medium which includes the same page is removed from the forming instruction (the first image forming instruction) to be transmitted to the first image forming apparatus 2-1. And the removed forming processing instruction is included in the forming processing instruction (the second image forming instruction) to be transmitted to the second image forming apparatus 2-2 capable of processing the forming processing instruction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an accepting unit that receives a forming instruction for forming an image;
   a selecting unit that selects a first image forming apparatus and a second image forming apparatus to form an image on recording media based on the received forming instruction;
   a first forming instruction generating unit that generates a first forming instruction that instructs the first image forming apparatus to form a first page of the image among plural pages of the image to be formed by extracting and removing a command from the received forming instruction;
   a second forming instruction generating unit that generates a second forming instruction that instructs the second image forming apparatus to form a second page of the image among the plural pages of the image to be formed, based on the command extracted from the received forming instruction; and
   a communicating section that transmits to the first image forming apparatus the first forming instruction and transmits to the second image forming apparatus the second forming instruction.

2. The image processing apparatus according to claim 1, further comprising:
   an inquiry unit that makes an inquiry as to whether to cause the second image forming apparatus to form the second page based on the forming instruction or to cause the first image forming apparatus to form the second page by changing the forming instruction; and
   a changing unit that changes a content of the forming instruction based on a result of the inquiry.

3. The image processing apparatus according to claim 1, further comprising:
   an inquiry unit that makes, when the selected first image forming apparatus is unavailable, an inquiry as to whether to cause the second image forming apparatus to form the first page or to wait for a predetermined time until the first image forming apparatus becomes available; and
   a changing unit that changes a content of an image forming processing base on a result of the inquiry.

4. The image processing apparatus according to claim 1, further comprising:
   a deciding unit that selects one of the first image forming apparatus and the second image forming apparatus that executes a formation processing every face of each recoding medium to be a forming target;
   wherein the first forming instruction generating unit and the second forming instruction generating unit generate the first forming instruction and the second forming instruction based on a result of the selection by the deciding unit, respectively.

5. The image processing apparatus according to claim 1, wherein the first forming instruction includes an instruction for causing the first image forming apparatus to perform post processing of the recording medium on which the first page is formed by the first image forming apparatus and the recording medium on which the second page is formed by the second image forming apparatus.

6. An image processing system comprising:
   a first image forming apparatus;
   a second image forming apparatus; and
   an image processing apparatus comprising:
      an accepting unit that receives a forming instruction for forming an image;
      a selecting unit that selects the first image forming apparatus and the second image forming apparatus to form an image on recording media based on the received image forming instruction;
      a first forming instruction generating unit that generates a first forming instruction that instructs the first image forming apparatus to form a first page of the image among plural pages of the image to be formed by extracting and removing a command from the received forming instruction;
      a second forming instruction generating unit that generates a second forming instruction that instructs the second image forming apparatus to form a second page of the image among the plural pages of the image to be formed, based on the command extracted from the received forming instruction; and
      a communicating section that transmits to the first image forming apparatus the first forming instruction and transmits to the second image forming apparatus the second forming instruction.

7. The image processing system according to claim 6, wherein the first forming instruction includes an instruction for causing the first image forming apparatus to perform post processing of the recording medium on which the first page is formed by the first image forming apparatus and the recording medium on which the second page is formed by the second image forming apparatus.

8. A computer readable medium storing a program causing a computer to execute a process for forming an image, the process comprising:
   receiving a forming instruction for forming an image;
   selecting a first image forming apparatus and a second image forming apparatus to form an image on recording media based on the received image forming instruction;
   generating a first forming instruction that instructs the first image forming apparatus to form a first page of the image among plural pages of the image to be formed by extracting and removing a command from the received image formation instruction;
   generating a second forming instruction that instructs the second image forming apparatus to form a second page of the image among the plural pages of the image to be formed, based on the command extracted from the received forming instruction; and
   transmitting to the first image forming apparatus the first forming instruction and transmitting to the second image forming apparatus the second forming instruction.

9. The computer readable medium according to claim 8, further comprising:
   making an inquiry as to whether to cause the second image forming apparatus to form the second page based on the forming instruction or to cause the first image forming apparatus to form the second page by changing the forming instruction; and
   changing a content of the forming instruction based on a result of the inquiry.

10. The computer readable medium according to claim 8, further comprising:

making, when the selected first image forming apparatus is unavailable, an inquiry as to whether to cause the second image forming apparatus to form the first page or to wait for a predetermined time until the first image processing apparatus becomes available; and changing a content of an image formation processing base on a result of the inquiry.

11. The computer readable medium according to claim 8, further comprising:

choosing one of the first image forming apparatus and the second image forming that executes a formation processing every face of each recoding medium to be a forming target;

wherein the generating the first forming instruction includes generating the first forming instruction based on a result of the choosing, and the generating the second forming instruction includes generating the second forming instruction based on the result of the choosing.

12. The computer readable medium according to claim 8, wherein the first forming instruction includes an instruction for causing the first image forming apparatus to perform post processing of the recording medium on which the first page is formed by the first image forming apparatus and the recording medium on which the second page is formed by the second image forming apparatus.

13. An image processing apparatus comprising:

an accepting unit that accepts a forming instruction for forming an image;

a selecting unit that selects at least a first image forming apparatus and a second image forming apparatus which (i) form an image on recording media based on the accepted image forming instruction and (ii) have a different performance from each other;

a first forming instruction generating unit that generates a first forming instruction for causing the first image forming apparatus to form a page that can be formed by the first image forming apparatus, among plural pages to be formed on the recording media in accordance with the accepted forming instruction;

a second forming instruction generating unit that generates a second forming instruction for causing the second image forming apparatus to form another page that cannot be formed by the first image forming apparatus, among the plural pages to be formed on the recording media;

an inquiry unit that makes an inquiry as to whether (i) causing the second image forming apparatus different from the selected first image forming apparatus to form the another page that cannot be formed by the selected first image forming apparatus or (ii) causing the selected first image forming apparatus to form the another page which cannot be formed by the selected first image forming apparatus, by changing the forming instruction; and a changing unit that changes a content of the forming instruction based on a result of the inquiry, wherein the first forming instruction includes an instruction for causing the first image forming apparatus to process (i) the recording medium on which the page is formed by the first image forming apparatus and (ii) the recording medium on which the another page is formed by the second image forming apparatus according to the first image forming apparatus.

* * * * *